United States Patent
Zhou

(10) Patent No.: US 11,890,153 B2
(45) Date of Patent: *Feb. 6, 2024

(54) STRUCTURE FOR COUPLING TOOTHBRUSH HEAD TO ELECTRIC TOOTHBRUSH HANDLE

(71) Applicant: JS Holding Inc., Dover, DE (US)

(72) Inventor: Xin Zhou, Irvine, CA (US)

(73) Assignee: Oralic Supplies Inc., Diamond Bar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,334

(22) Filed: Mar. 29, 2023

(65) Prior Publication Data

US 2023/0233301 A1    Jul. 27, 2023

Related U.S. Application Data

(63) Continuation of application No. 17/648,327, filed on Jan. 19, 2022, now Pat. No. 11,638,635, which is a continuation of application No. 17/355,588, filed on Jun. 23, 2021, now Pat. No. 11,229,507, which is a continuation of application No. 17/145,911, filed on Jan. 11, 2021, now Pat. No. 11,071,613.

(60) Provisional application No. 63/053,960, filed on Jul. 20, 2020.

(51) Int. Cl.
*A61C 17/22* (2006.01)
*A46B 5/00* (2006.01)
*A46B 9/04* (2006.01)

(52) U.S. Cl.
CPC .......... *A61C 17/222* (2013.01); *A46B 5/0095* (2013.01); *A46B 9/04* (2013.01)

(58) Field of Classification Search
CPC ... A61C 17/222; A61C 17/225; A46B 5/0095; A46B 5/904

See application file for complete search history.

(56) References Cited

U.S. PATENT DOCUMENTS

| | | |
|---|---|---|
| 3,369,265 A | 2/1968 | Halberstadt et al. |
| 5,197,161 A | 3/1993 | Howie, Jr. |
| 5,289,604 A | 3/1994 | Kressner |

(Continued)

FOREIGN PATENT DOCUMENTS

| | | |
|---|---|---|
| CA | 2841901 A1 | 1/2013 |
| WO | 2013104020 A1 | 7/2013 |

OTHER PUBLICATIONS

Pro Power Toothbrush Replacement Heads, advertisement from Target.com website, http://www.target.com/p/pro-power-toothbrush-replacement-heads-3pk-up-up-153/-/A-163 . . . , Publication dated Apr. 14, 2017.

(Continued)

*Primary Examiner* — Shay Karls
(74) *Attorney, Agent, or Firm* — Fox Rothschild LLP

(57) ABSTRACT

This document also discloses a member for mounting a toothbrush head to an electric toothbrush. The member includes a base having an opening for receiving a drive shaft of an electric toothbrush. The member also includes a coupling section that includes a cylindrical sidewall that surrounds a cavity for receiving the drive shaft. The member includes a spring in the coupling section. The spring is positioned to transfer vibration from the drive shaft to the toothbrush head when operated.

18 Claims, 11 Drawing Sheets

(56) References Cited

U.S. PATENT DOCUMENTS

| | | |
|---|---|---|
| D549,964 S | 9/2007 | Roth et al. |
| 7,386,906 B2 | 6/2008 | Roth et al. |
| D601,803 S | 10/2009 | Reishus et al. |
| D683,139 S | 5/2013 | Chikos et al. |
| 8,484,788 B2 | 7/2013 | Brewer et al. |
| 8,782,841 B2 | 7/2014 | Sale et al. |
| D715,554 S | 10/2014 | Hosler et al. |
| D715,555 S | 10/2014 | Hosler et al. |
| D715,556 S | 10/2014 | Brewer |
| D715,557 S | 10/2014 | Brewer et al. |
| D715,558 S | 10/2014 | Brewer |
| 9,107,486 B2 | 8/2015 | Brewer et al. |
| 9,827,079 B1 | 11/2017 | Liu |
| 10,470,858 B2 | 11/2019 | Liu |
| 10,531,729 B1 | 1/2020 | Liu |
| 11,638,635 B2 * | 5/2023 | Zhou ............... A46B 9/04 15/22.1 |
| 2003/0101526 A1 | 6/2003 | Hilscher et al. |
| 2005/0108838 A1 | 5/2005 | Schaefer et al. |
| 2011/0107536 A1 | 5/2011 | Dabrowski et al. |
| 2013/0255014 A1 | 10/2013 | Kloster |
| 2015/0082560 A1 | 3/2015 | Graeve |
| 2015/0141884 A1 | 5/2015 | Thiebaut et al. |
| 2015/0211378 A1 | 7/2015 | Johnson et al. |
| 2015/0245895 A1 | 9/2015 | Kressner |

OTHER PUBLICATIONS

Hage, A., Investigations on the germ colonization of electric toothbrushes—a comparison between sonic and rotating-oscillating toothbrushes, INAUGURAL Faculty of Medicine of the Georg-August-Universität zu Göttingen, Nov. 9, 2010.

* cited by examiner

STRUCTURE FOR COUPLING TOOTHBRUSH HEAD TO ELECTRIC TOOTHBRUSH HANDLE

RELATED APPLICATIONS AND CLAIM OF PRIORITY

This patent document claims priority to and is a continuation of U.S. patent application Ser. No. 17/648,327, filed Jan. 19, 2022 (now allowed), which claims priority to U.S. patent application Ser. No. 17/355,588 filed Jun. 23, 2021 (which corresponds to U.S. Pat. No. 11,229,507), which claims priority to U.S. patent application Ser. No. 17/145,911 filed Jan. 11, 2021 (which corresponds to U.S. Pat. No. 11,071,613), which claims priority to U.S. Provisional Patent Application No. 63/053,960, filed Jul. 20, 2020. The disclosures of each priority application are fully incorporated into this document by reference.

BACKGROUND

This disclosure relates to the field of electric toothbrushes, and particularly brush heads that are configured to couple to an electric toothbrush handle.

Many types of electric toothbrushes use high speed vibrations of the motor inside the toothbrush handle to drive the brush head. In order to operate the electric toothbrush, the construction of the brush head requires that it be tightly coupled to the drive shaft of the toothbrush handle so it can withstand the high speed vibrations from operating the toothbrush. Many existing products, therefore, use metal or springs inside the brush head to facilitate a tight coupling to the drive shaft of the toothbrush handle. This can increase the cost of making the brush head.

In addition, while some brush heads avoid the use of metal springs, those brush heads can sometimes have difficulty staying connected to the handle, and/or may not offer as much vibratory effect due to a loose fit.

This patent document describes an apparatus that addresses at least some of the issues described above and/or other issues.

SUMMARY

In a first aspect, this document discloses a coupling member for mounting a toothbrush head to an electric toothbrush. The coupling member includes a base having a first end with an opening for receiving a drive shaft of an electric toothbrush. The coupling member also includes a coupling section that extends from a second end of the base. The coupling section comprises a cylindrical sidewall that surrounds a cavity for receiving the drive shaft, and a set of teeth that extend into the cavity from the cylindrical sidewall along a longitudinal axis of the coupling section.

Optionally, the base may include one or more mounting holes that are each positioned to align with a corresponding mounting ridge of a stem of the toothbrush head. The coupling section may include a longitudinal ridge that is positioned on the sidewall along the longitudinal axis of the coupling section and sized to engage with a channel inside of a stem of a toothbrush head. The cylindrical sidewall may be a closed sidewall, with no opening leading to the cavity, or it may include slits that provide an opening leading to the cavity, in which case a resilient spring member may be positioned between the two slits, and the teeth may be positioned on the resilient spring member. The resilient spring member may extend all the way to the base, or an opening may exist between the resilient spring member and the base so that the opening and slits together form a U-shape.

In a second embodiment, a coupling member for mounting a toothbrush head to an electric toothbrush includes a base having a first end with an opening for receiving a drive shaft of an electric toothbrush, along with a coupling section that extends from a second end of the base. The coupling section includes a cylindrical sidewall that surrounds a cavity for receiving the drive shaft, an aperture in the cylindrical sidewall that provides an opening to the cavity, and a resilient spring member that is sized to be positioned within the aperture and touch the drive shaft while being held by the aperture.

Optionally, in the second embodiment the resilient spring member may include a base that and two sidewalls that are positioned so that, in operation, the resilient spring member will touch the drive shaft and the two sidewalls will touch and be held by the aperture. The distance between the two sidewalls of the resilient spring member when the resilient spring member is in a relaxed position may be greater than a corresponding dimension of the aperture. The base of the coupling member may include one or more mounting holes that are each positioned to align with a corresponding mounting ridge of a stem of the toothbrush head. The coupling section of the coupling member may include a longitudinal ridge that is positioned on the sidewall along the longitudinal axis of the coupling section and sized to engage with a channel inside of a stem of a toothbrush head. A set of teeth may extend into the cavity from the cylindrical sidewall along the longitudinal axis.

Any of the embodiments described above may be used with a toothbrush head for an electric toothbrush, in which the toothbrush head includes a brush section that has a bristle tray and bristles that extend from the bristle tray. A stem extends from the brush section and defines a cavity therein one or more mounting ridges on inside wall of the opening. The coupling member may be positioned inside the cavity of the stem. Any of the embodiments described above may be used with an electric toothbrush having a handle and a drive shaft, in which case the stem will extend to the handle and the drive shaft will be inserted into the coupling member.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document, the term "connected", when referring to two physical structures, means that the two physical structures touch each other. Devices that are connected may be secured to each other, or they may simply touch each other and not be secured.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

This disclosure is not limited to the particular systems, methodologies or protocols described, as these may vary. The terminology used in this description is for the purpose of describing the particular versions or embodiments only, and is not intended to limit the scope.

Figure 1:
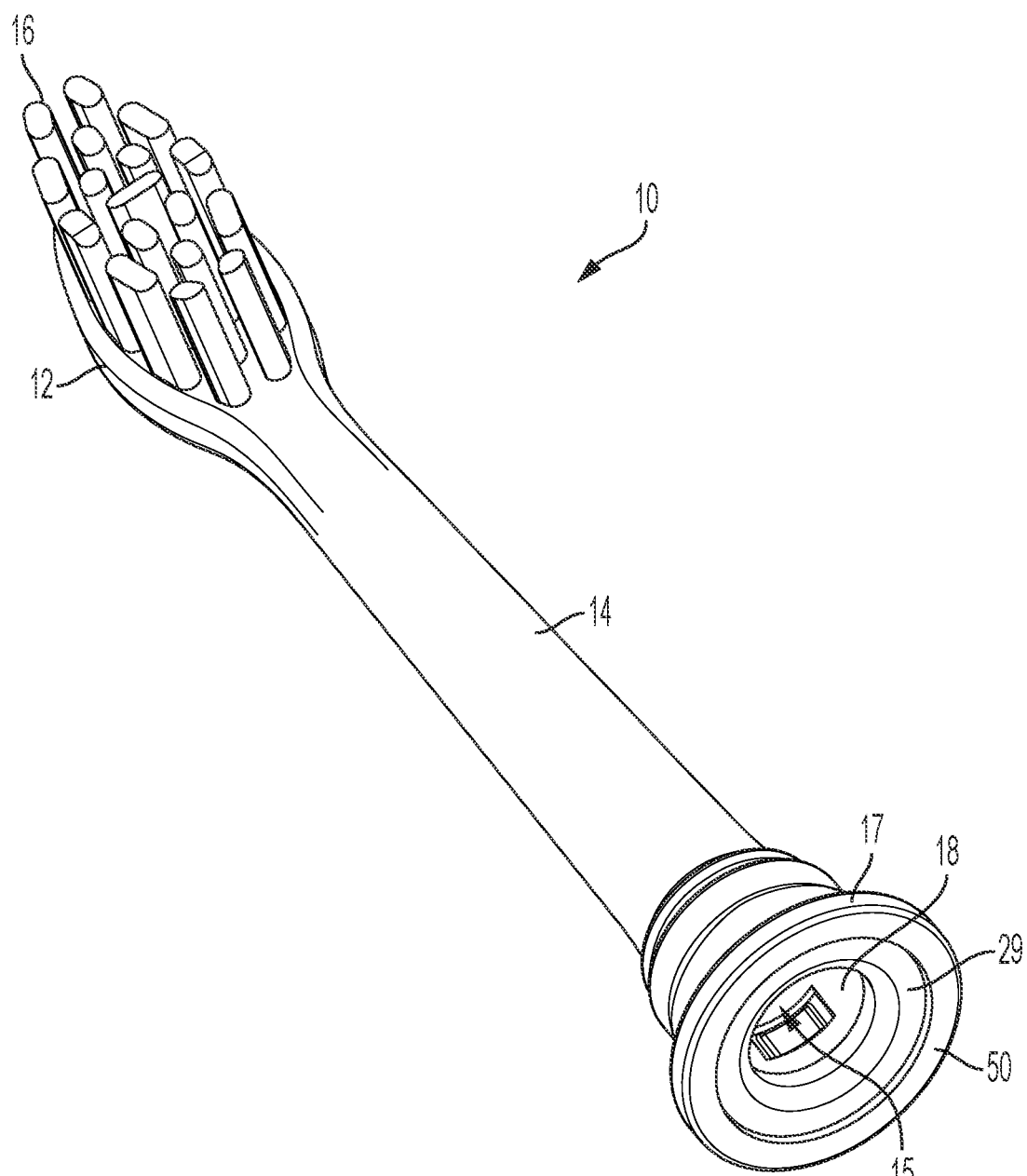
FIG. 1 is a perspective view of a toothbrush head with a coupling member connected inside of it.
Figure 10A:
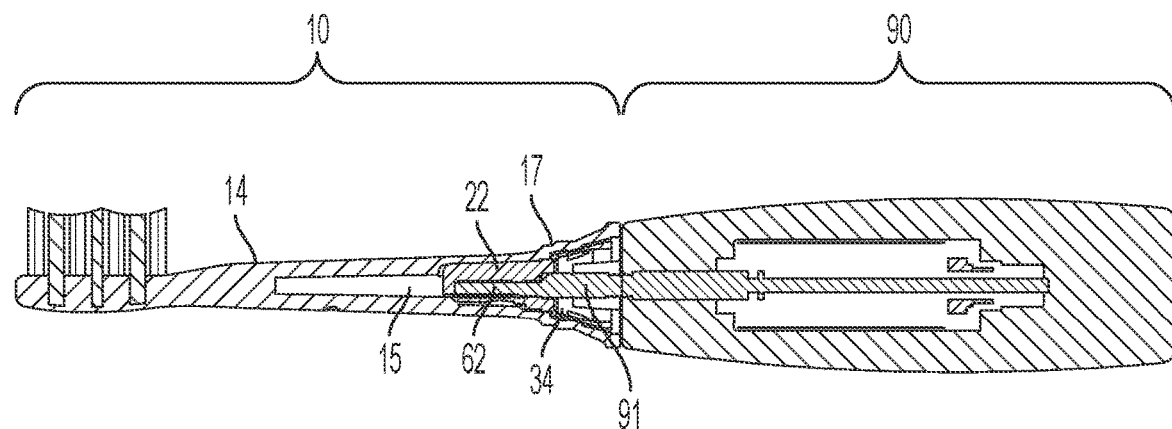
FIG. 10A is a cross-sectional view.

In various embodiments, a brush head 10 is couplable to a drive shaft of an electric toothbrush handle, as shown in FIG. 10A. As shown in FIG. 1, the brush head 10 includes a bristle tray 12 that is a substrate from which multiple attached bristles 16 extend. The brush head 10 also has a stem 14, which extends from the bristle tray 12, leading to a base 17 that flares outward from the stem. In use, the base will be placed over a drive shaft of an electric toothbrush handle.

The stem 14 and base 17 each have an opening that leads to a channel 15 for receiving and mounting a coupling member 18. The coupling member 18 is the structure that will receive and attach to the drive shaft of the electric toothbrush handle.

One configuration for attachment of the coupling member 18 to the stem 14 is further described in detail with reference to FIGS. 2-4, which illustrate various views of a coupling member 18. The coupling member 18 has a base 26 and a coupling section 22. The base 26 has an opening 27 for receiving the drive shaft of an electric toothbrush handle. The opening 27 is at one end (which may be referred to as a bottom end) of the base 26. The opposite end (which may be referred to as a top) of the base 26 is the end from which the coupling section 22 extends. The top end of the base 26 has a diameter that is narrower than the diameter of the opening 27 so that the body flares outward as the distance from a handle coupling section 22 increases. The base 26 has one or more mounting holes 28a, 28b that are positioned to engage with one or more mounting ridges (54 in FIG. 9) of the stem so that the coupling member 18 can be mounted to the stem. Optionally, the mounting holes 28a, 28b may be positioned directly opposite (i.e., approximately 180° away from) each other on the body as shown in FIGS. 3 and 4.

The coupling section 22 has a generally cylindrical sidewall 24 that surrounds a cavity 34 that will receive the drive shaft of the electric toothbrush. Optionally, the sidewall 24 may be closed so that no opening exists from the outside of the coupling section 22 to the interior coupling section 22. Alternatively, the coupling section 22 may include an opening (as shown with coupling section 222 of FIG. 8 which will be described in more detail below). In the embodiment shown in FIGS. 2-4, the coupling section 22 may include a longitudinal ridge 46 on an outside surface of the sidewall 24 with an opening inside of it for receiving the tip of the drive shaft. The longitudinal ridge 46 is positioned and sized to engage with a longitudinal channel inside the stem (shown as 64 in FIG. 10A). A relatively narrow segment 46a of the longitudinal ridge will engage the longitudinal channel, and an optional relatively wide segment 46b (i.e., relatively wider than the narrow segment 46a) may serve as a stop and limit the distance of travel of the longitudinal ridge 46 into the longitudinal channel 64. This engagement between the longitudinal ridge 46 and the longitudinal channel 64 inside the stem prevents the coupling member from rotational movement about the axis of the stem. It further provides a guide to facilitate the insertion of the coupling member into the stem.

Figure 3:
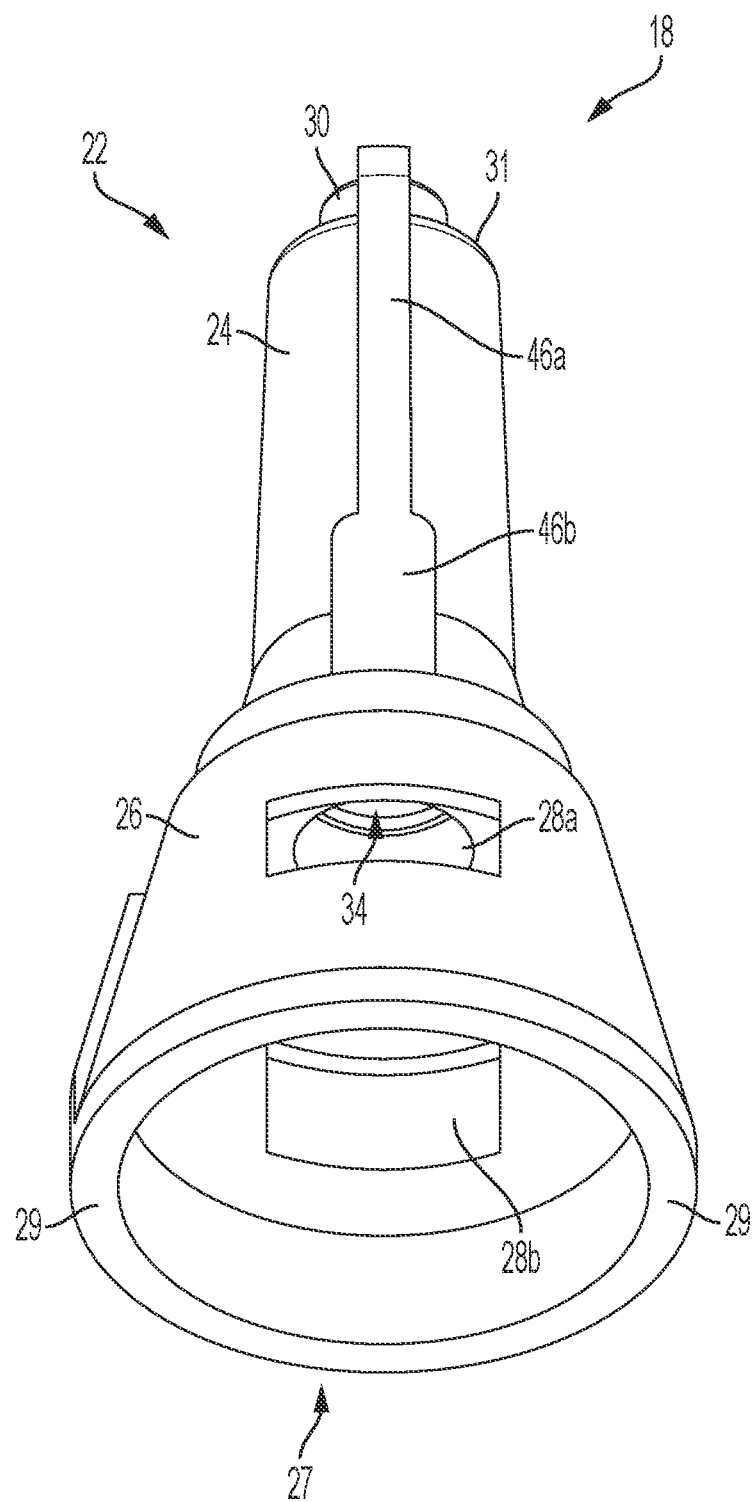
FIG. 3 is an alternate perspective view of the coupling member of FIG. 2.
Figure 4:
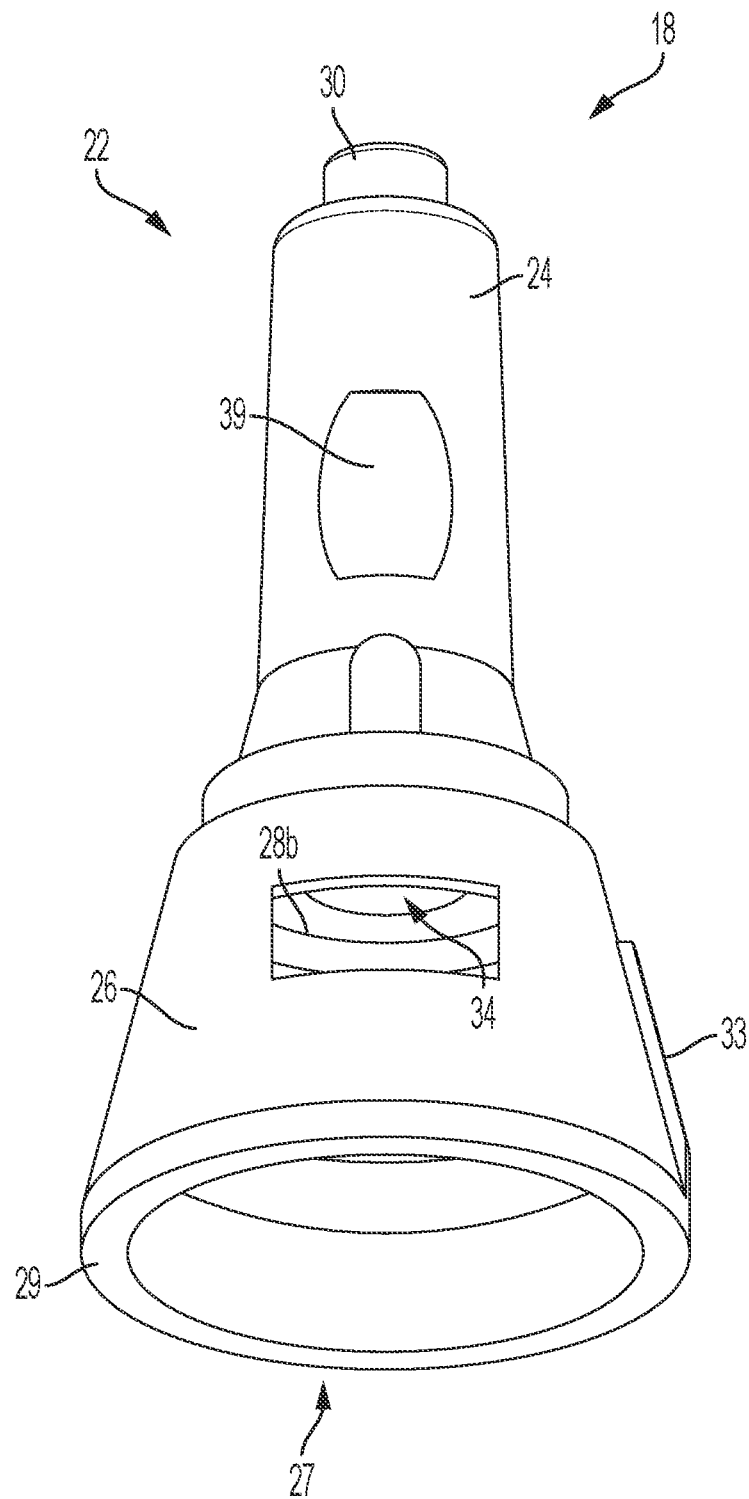
FIG. 4 is a side view of the coupling member of FIG. 2.

Optionally, as shown in FIG. 3, the longitudinal ridge 46 may also extend longitudinally from the base 26 along outside surface of the sidewall 24 of the handle coupling section 22 of the coupling member to further enhance the engagement between the coupling member 18 and the stem and prevent rotational movement or twisting of the coupling member relative to the stem.

In the illustrated embodiment, the size and shape of the cross-section of the coupling section 22 may correspond to the size and shape of the stem 14 of the brush head 10, for example, at about ⅛ inch in diameter measured from outside, with a length about ½ inch. The base 26 may extend from the coupling section and flare outward to the opening 27 to form a semi-conical shape. The opening 27 may be of various sizes, for example, at ½ inch in diameter as measured from outside at its widest point.

In various embodiments, multiple engagements between various parts may additionally facilitate the tight coupling between the brush head and the coupling member. For example, in FIGS. 2-4, the coupling member 18 may have one or more mounting blocks 33 extending from outside the base 26 and that are positioned to engage with one or more mounting receptacles 56 inside the channel 15 of the stem 14 (see FIG. 9). This engagement between each mounting block 33 and its corresponding mounting receptacles 56 (in FIG. 9) will further lock the coupling member into position to prevent the coupling member from being pushed in or rotating about the axis of the stem.

Figure 2:
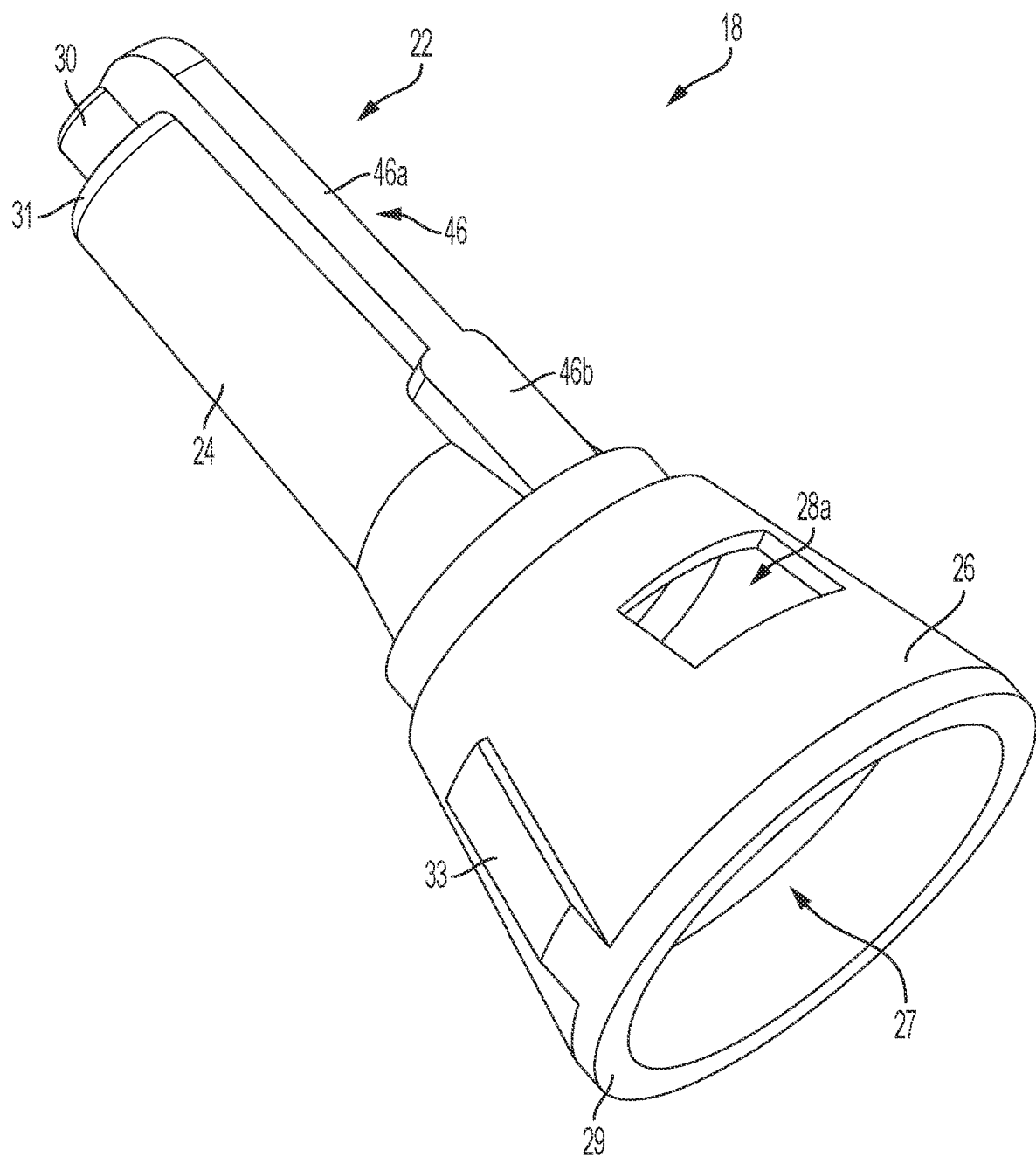
FIG. 2 is a perspective view of a coupling member.

Alternatively, and/or additionally, as shown in FIGS. 2-4, the coupling section 22 may end with a tip 30 that has a diameter that is smaller than that of the sidewall 24. The tip 30 meets the sidewall 24 at a ledge 31. The tip 30 and ledge 31 further facilitate the coupling of the coupling section 22 and the stem 14, and the ledge 30 serves as a stop to limit the distance of travel of the coupling member 22 into the stem 14.

Figure 5:
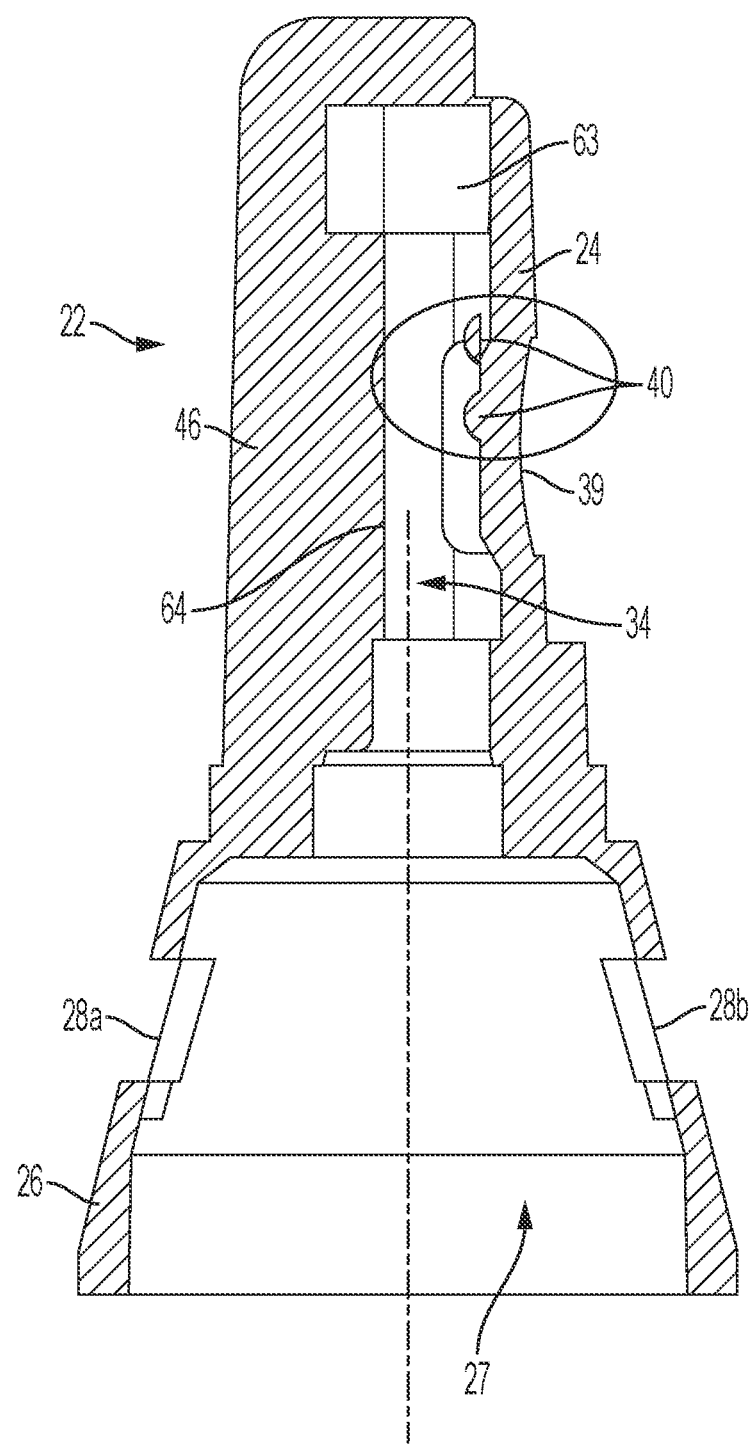
FIG. 5 is a cross-sectional view of the coupling member of FIG. 2.

Alternatively, and/or additionally, the coupling member 18 may have an engagement means for further coupling the brush head to the drive shaft of the toothbrush handle. As shown in the coupling member's cross-sectional view of FIG. 5, this engagement means may include a gear 40 that extends inward into a cavity 34 from the sidewall 24 and is positioned to touch the drive shaft when the drive shaft is inserted into the cavity 34 of the coupling section 22. The gear 40 is referred to as a gear because, as shown in FIG. 5, the gear 40 includes multiple teeth (i.e., bumps or other raised areas) that extend inward from the sidewall 24 along the longitudinal axis of the cavity 34. The teeth of the gear 40, when touching the drive shaft, provide friction that helps to retain drive shaft of the electric toothbrush handle in place during operation. The teeth may be positioned in any location on the interior sidewall. FIGS. 4 and 5 show that the gear 40 may be positioned along an interior portion of sidewall 24 in a location that corresponds to that of an indentation 39 to further increase engagement of the gear 40 with the drive shaft. The teeth may be soft and/or resilient, to provide a spring function that allows the drive shaft to vibrate when the teeth are positioned against the drive shaft. For example, the teeth may be formed of a soft plastic such as a low density polyethylene (LDPE), rubber, or other soft yet strong material. The entire coupling member may be made of such material, or the teeth and other components of the coupling member may be made of different materials.

Figure 6A:
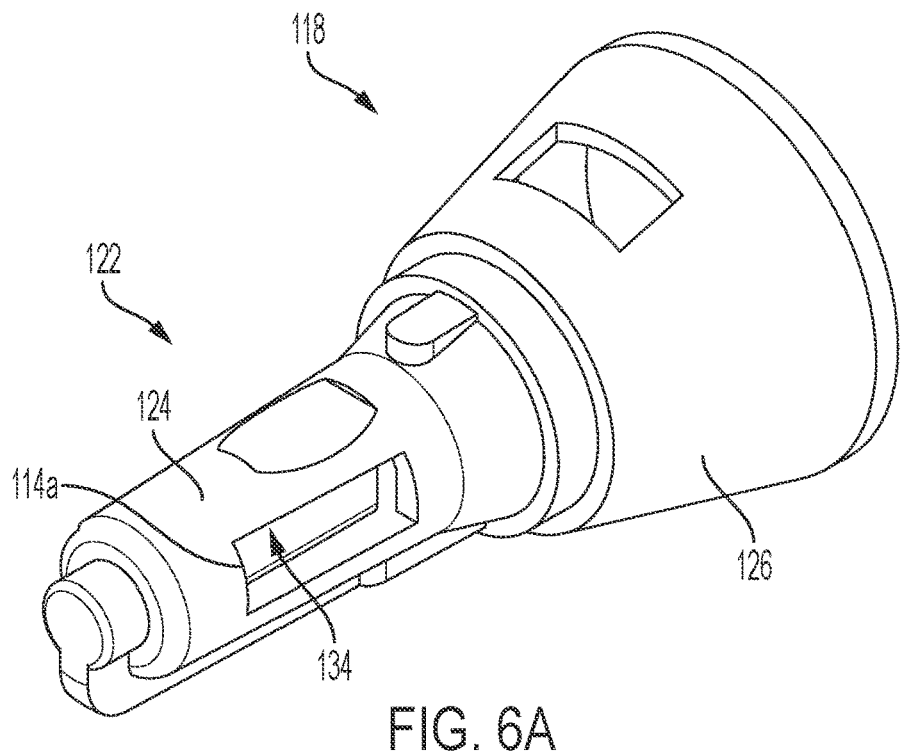
FIGS. 6A and 6B illustrate an alternate embodiment of a coupling member.
Figure 6B:
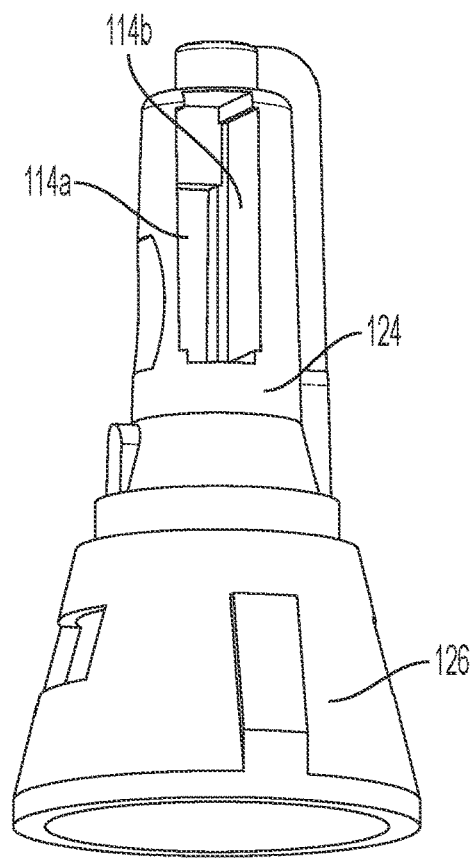
Figure 6C:
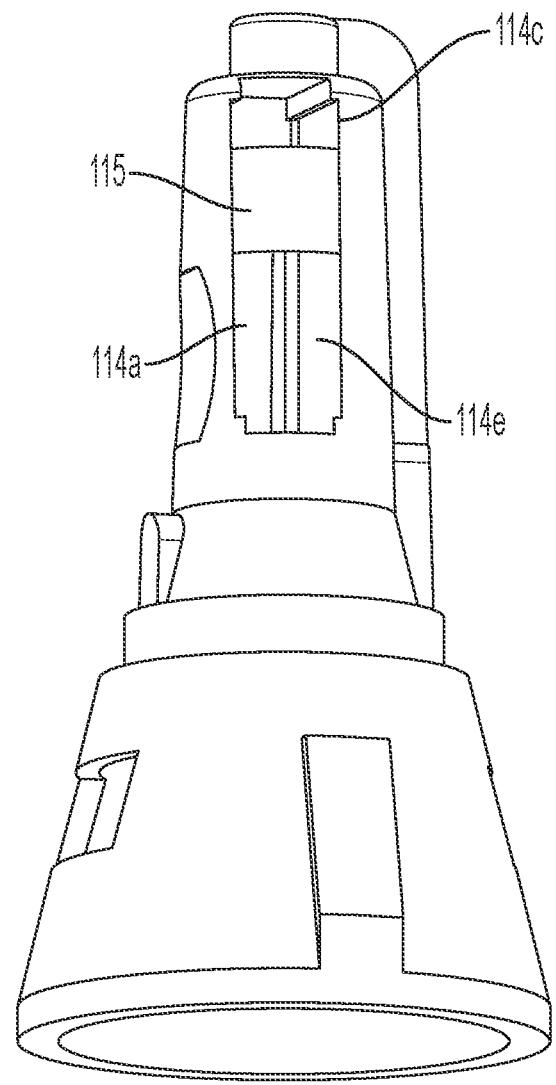
FIG. 6C illustrates a variation of the embodiment shown in FIG. 6B.
Figure 7A:
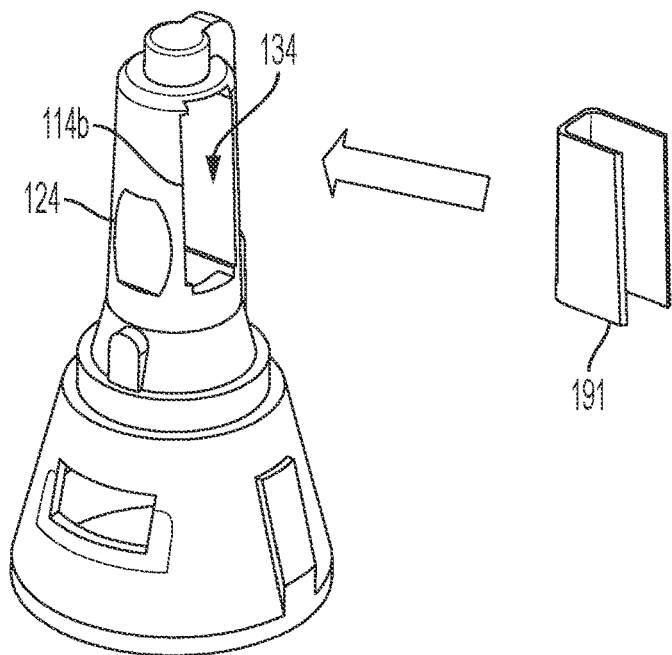
FIGS. 7A and 7B illustrate how a spring may be used with the embodiment of FIGS. 6A and 6B.
Figure 7B:
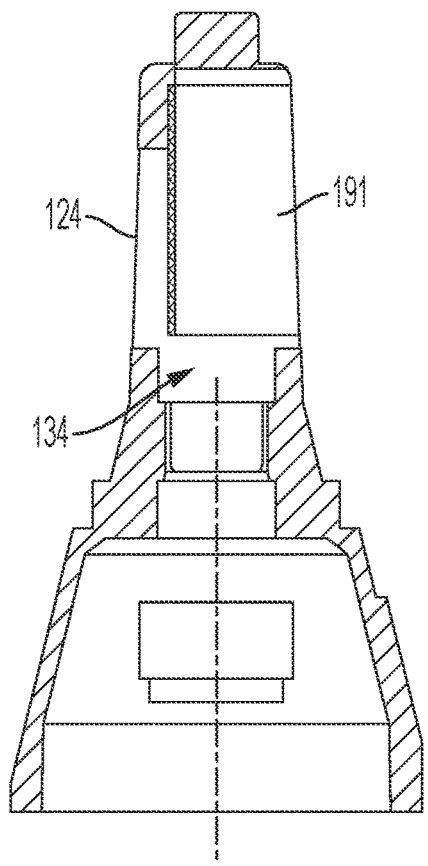

FIGS. 6A-6B and 7A-7B illustrate an alternate embodiment of a coupling member 118 that is similar in structure to that of FIGS. 2-4, with a base 126 and a coupling section 122 having a cylindrical sidewall 124. However, unlike the sidewall 24 of FIGS. 2-4, in FIGS. 6A-6B and 7A-7B sidewall 124 includes one or more apertures 114a that provide an opening that leads to the central cavity that receives the drive shaft of the electric toothbrush. As shown in FIG. 7A, a resilient spring 191 may be inserted into the aperture 114a and touch the drive shaft to help provide stability and transfer vibration to the stem of the toothbrush head. Alternatively, resilient spring 191 may be inserted into the other aperture 114b and touch the drive shaft to help provide stability and transfer vibration to the stem of the toothbrush head. The spring 191 as shown may be U-shaped, with a flat or curved base from which two sides extend. FIG. 7B is a cross-sectional view showing the spring 191 as it may be inserted into the cavity 134 within the sidewall 124. The aperture locations and sizes shown in FIG. 6B are by way of example, and this embodiment is not limited to the specific aperture shape and size shown. For example, as shown in FIG. 6C, instead of a single aperture 114b along the side may include two or more apertures 114c, 114e separated by a spacer 115 that forms part of the sidewall The spacer may serve to hold the drive shaft in place and may optionally have teeth as described above, while the apertures 114a, 114c, 114e provide some room for movement of the drive shaft.

The spring 191 may be formed of a thin strip of metal or another strong yet resilient material. The spring 191 may be sized to extend into the cavity so that the flat or curved base, and the two sides that extend from the base, will be positioned around the drive shaft so that some or all of the spring's sides touch the drive shaft. The two sides that extend from the base of the spring 191 will be flush with or extend only slightly beyond the aperture 114a (or 114b) of the sidewall 124 into which it is inserted. The base of the spring 191 will have dimensions that are equal to or slightly smaller than that of the aperture. The sides of the spring 191 may flare slightly outward so that the maximum distance between the sides is slightly larger than a corresponding size of the aperture 114 when the spring 191 is in a relaxed position. The spring 191 may thus be squeezed to be inserted into the aperture and relaxed to be held in place by a friction fit at the aperture 114a (or 114b).

Figure 8:
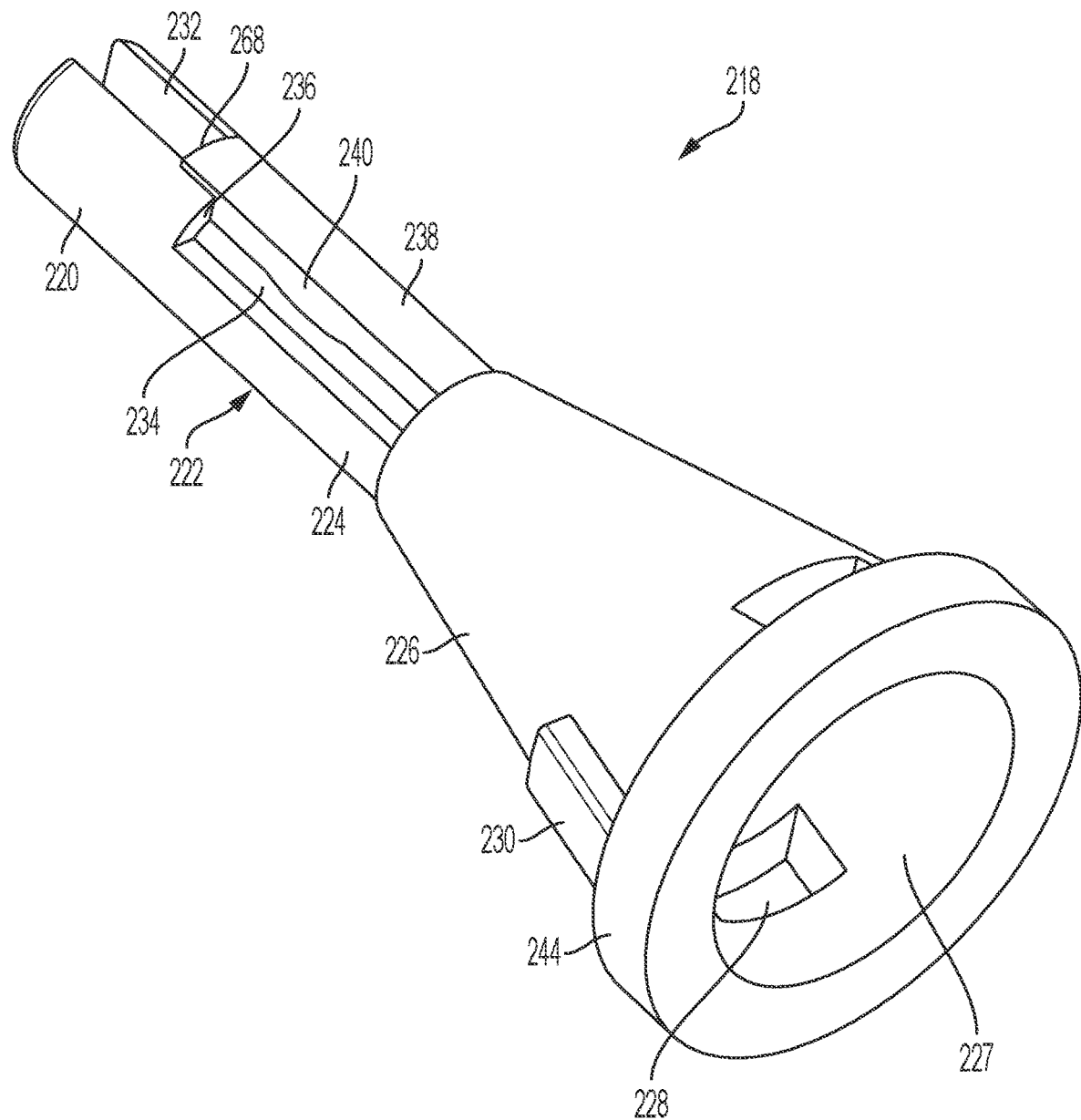
FIG. 8 illustrates another alternate embodiment of a coupling member.

FIG. 8 illustrates an alternate embodiment of a coupling member 218 such as that shown in U.S. Pat. No. 9,827,079, the disclosure of which is incorporated into this document by reference. As shown in FIG. 8, the coupling member 218 has a base 226, which has an opening 227 for receiving a drive shaft of the electric toothbrush handle. The base 226 may have one or more mounting holes 228 that are positioned to engage with one or more mounting ridges of the stem so that the coupling member can be mounted to the stem. The coupling member 218 also may have one or more mounting blocks 230 extending from outside the base 226 and that are positioned to engage with one or more mounting receptacles inside the opening of the stem.

The coupling member 218 also has a coupling section 222, which has a sidewall 224 with a cavity 234 inside of it. The sidewall 224 has at least two longitudinal slits 236 that form a resilient wall 238 in between. The resilient spring member 238 is positioned to touch the drive shaft of the electric toothbrush handle when the drive shaft is inserted into the cavity 234 inside the sidewall 234 and exert a return force inward towards the drive shaft to achieve a tight coupling with the drive shaft. The resilient spring member 238 may extend all the way down to and touch the base 226 as shown, or an opening may exist between the resilient spring member 238 and the base 226 so that the two longitudinal slits 236 and an opening between the resilient spring member 238 and the base 226 form a U-shape.

Alternatively, and/or additionally, the coupling member 218 of FIG. 8 may have an engagement means for further coupling the brush head to the drive shaft of the toothbrush handle. This engagement means may include a raised portion 240 that extends inward from the resilient wall 238 and is positioned to touch the drive shaft when the drive shaft is inserted into the cavity 234 of the coupling section 222. The raised portion 240, when touching the drive shaft, will also raise the resilient wall 238 outward, thus to increase the inward returning force of the resilient wall 238, whereby a tighter coupling between the coupling member and the drive shaft of the electric toothbrush handle can be achieved.

Further, the interior wall of the resilient spring member 238 may include teeth that serve as a gear, as with gear 40 of FIG. 5.

Figure 9:
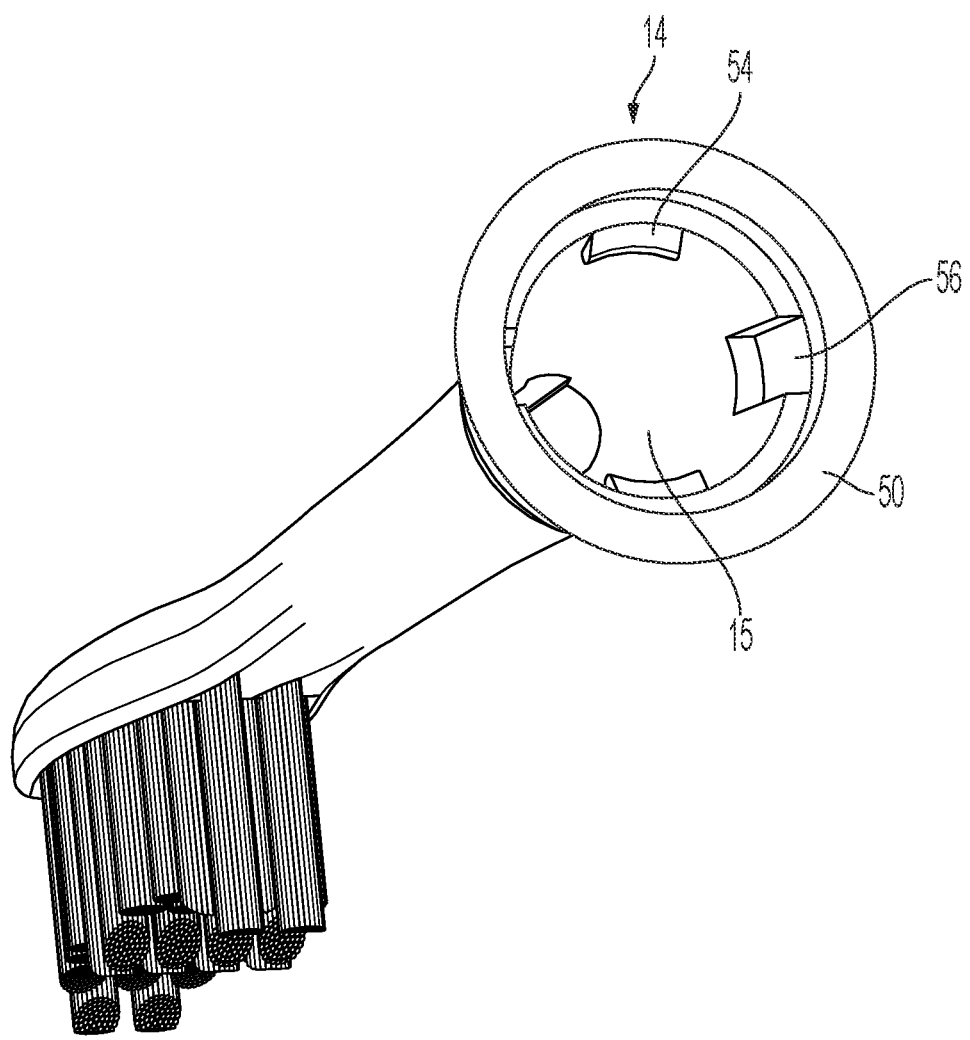
FIG. 9 is a bottom perspective view of the stem of a toothbrush head with a coupling member according to the embodiment in FIG. 1 inside of it

As shown in FIG. 9, the channel 15 of the stem 14 may open at a base platform 50. FIG. 1 illustrates that the opening 27 of the base 26 of the coupling member 18 may also have a base platform 29 that is positioned to be flush with, or slightly offset within the stem from, the base platform 50 of the stem 14 when the coupling member and the stem are fully engaged.

Figure 10B:
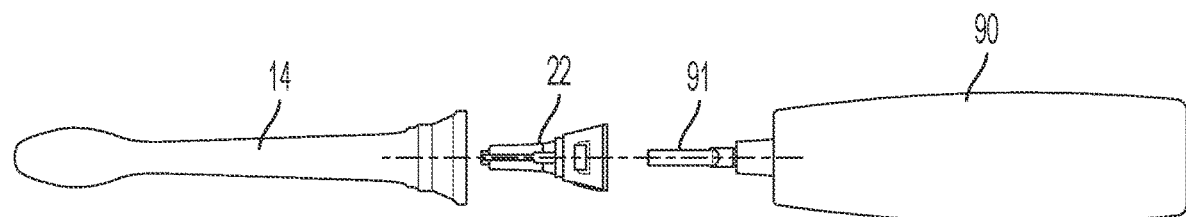
FIG. 10B is an exploded view, illustrating how the toothbrush head and its coupling member may attach to a toothbrush handle.

FIG. 10A is a cross sectional assembled view, and FIG. 10B is an exploded view, each that together illustrate that the stem 14 of the brush head 10 includes a channel 15 for receiving the coupling section 22, which in turn has a cavity 34 for receiving the drive shaft 91 of the toothbrush handle 90. The coupling section 22 is inserted into the channel 15 at the base 17 of the brush head 10. Although the illustration in FIGS. 10A-10B shows the coupling section 22 of FIGS.

2-4, any of the coupling member embodiments described in this document may be used in the configuration shown in FIGS. 10A-10B.

The various embodiments disclosed in this patent document provide advantages over the prior art, whether stand-alone or combined. For example, the resilient wall of the handle coupling section of the coupling member that is positioned to engage with the drive shaft of the electric toothbrush handle may be made from the same wall of the handle coupling section of the coupling member, which requires no metal spring or other separate resilient member. This both achieves a tight coupling (because there is no separate part) and reduces the cost of making. Further, multiple engagements of various parts of the stem and the coupling member all facilitate a tight coupling between the coupling member and the stem, and thus improve the stability of the brush head as it is operating under the high speed vibrations of the motor inside the handle.

Further, the toothbrush head may be easy to manufacture as all the parts can be made of plastic or polyester materials. The cone shaped opening of the stem may facilitate easy receiving and coupling of the coupling member into the stem, and multiple engagement means, such as, the longitudinal ridge of the coupling member and the corresponding longitudinal channel in the stem, the mounting channel of the coupling member and the corresponding ridge block in the stem, the raised resilient wall of the coupling member and the corresponding coupling channel in the stem, the mounting block of the coupling member and the corresponding mounting channel in the stem, the base ring of the coupling member and the mating sitting platform in the stem, the mounting holes of the coupling member and the mounting ridges in the stem, each may facilitate easy sliding and positioning of the coupling member into the stem and secure mounting of the coupling member to the stem.

Other advantages of the present invention can be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described in this document, but is intended to include all changes and modifications that are within the scope and spirit of the invention as defined in the claims.

The invention claimed is:

1. A toothbrush head for an electric toothbrush, the toothbrush head comprising:
a brush that comprises a plurality of bristles;
a base having an opening for receiving a drive shaft of an electric toothbrush, and
a coupling section that extends from the base, wherein the coupling section comprises:
a cylindrical sidewall that surrounds a cavity for receiving the drive shaft; and
a spring comprising a flat or curved base from which two sides extend, the spring being positioned to, when in operation, transfer vibration from the drive shaft to the toothbrush head;
wherein the two sides of the spring contact the sidewall.

2. The toothbrush head of claim 1, wherein the spring is made of metal.

3. The toothbrush head of claim 1, wherein the two sides of the spring are flush with an aperture into which the spring is inserted.

4. The toothbrush head of claim 1, wherein the cylindrical sidewall further comprises an aperture.

5. The toothbrush head of claim 4, wherein the spring is positioned within the aperture.

6. The toothbrush head of claim 5, wherein the spring is held in place by a friction fit in the aperture.

7. The toothbrush head of claim 4, wherein the flat or curved base of the spring extends into the aperture.

8. The toothbrush head of claim 4, wherein a maximum distance between the two sides is larger than a corresponding size of the aperture when the spring is in a relaxed position.

9. The toothbrush head of claim 1, wherein the spring is further positioned, when in operation, to contact the drive shaft.

10. A member for mounting a toothbrush head to an electric toothbrush, the member comprising:
a base having an opening for receiving a drive shaft of an electric toothbrush; and
a coupling section, wherein the coupling section comprises:
a cylindrical sidewall that surrounds a cavity for receiving the drive shaft, and
a spring comprising a flat or curved base from which two sides extend, the spring being positioned to, when in operation, transfer vibration from the drive shaft to the toothbrush head;
wherein the two sides of the spring contact the sidewall.

11. The member of claim 10, wherein the spring is made of metal.

12. The member of claim 10, wherein the two sides of the spring are flush with an aperture into which the spring is inserted.

13. The member of claim 10, wherein the cylindrical sidewall further comprises an aperture.

14. The member of claim 13, wherein the spring is positioned within the aperture.

15. The member of claim 14, wherein the spring is held in place by a friction fit in the aperture.

16. The member of claim 13, wherein the flat or curved base of the spring extends into the aperture.

17. The member of claim 13, wherein a maximum distance between the two sides is larger than a corresponding size of the aperture when the spring is in a relaxed position.

18. The member of claim 10, wherein the spring is further positioned, when in operation, to contact the drive shaft.

* * * * *